(12) United States Patent
Glogger et al.

(10) Patent No.: US 9,551,370 B2
(45) Date of Patent: Jan. 24, 2017

(54) ANCHORING SLEEVE

(75) Inventors: Josef Glogger, Buchloe (DE); Uwe Bohn, Kissing (DE); Herbert Ginter, Germaringen (DE)

(73) Assignee: Hilti Aktiengesellschaft, Schaan (LI)

( * ) Notice: Subject to any disclaimer, the term of this patent is extended or adjusted under 35 U.S.C. 154(b) by 659 days.

(21) Appl. No.: 12/856,354

(22) Filed: Aug. 13, 2010

(65) Prior Publication Data

US 2011/0038686 A1   Feb. 17, 2011

(30) Foreign Application Priority Data

Aug. 14, 2009   (DE) .................. 10 2009 028 545

(51) Int. Cl.
*F16B 13/04*   (2006.01)
*F16B 13/14*   (2006.01)

(52) U.S. Cl.
CPC ............ *F16B 13/141* (2013.01); *F16B 13/144* (2013.01); *Y10T 29/49826* (2015.01)

(58) Field of Classification Search
CPC ............ F16B 13/14; F16B 13/141; E01B 9/16
USPC ...... 411/17, 82, 82.1, 258, 511, 930, 16, 44, 411/71; 405/259.5, 259.6; 52/745.21, 704
See application file for complete search history.

(56) References Cited

U.S. PATENT DOCUMENTS

| | | | | |
|---|---|---|---|---|
| 4,085,652 A * | 4/1978 | Vanotti | ...................... | E01B 9/10 411/17 |
| 4,094,054 A | 6/1978 | Fischer | | |
| 4,160,614 A * | 7/1979 | Koval | ........................ | 405/259.3 |
| 4,224,971 A * | 9/1980 | Muller et al. | ................... | 411/15 |
| 4,836,729 A * | 6/1989 | Bisping et al. | .............. | 411/82.1 |
| 5,085,547 A * | 2/1992 | Vanotti | ........................... | 411/72 |
| 5,143,498 A * | 9/1992 | Whitman | ........................ | 411/82 |
| 5,145,301 A * | 9/1992 | Yamamoto | ...................... | 411/82 |
| 5,219,248 A * | 6/1993 | Wright | ........................ | 405/259.4 |
| 5,219,452 A * | 6/1993 | Yamamoto | ................... | 411/82.1 |
| 5,490,750 A * | 2/1996 | Gundy | .................. | F16B 13/124 411/55 |
| 5,536,122 A * | 7/1996 | Weber | .............................. | 411/33 |
| 5,628,161 A * | 5/1997 | Giannuzzi et al. | ............. | 52/698 |
| 5,641,256 A * | 6/1997 | Gundy | .................. | F16B 13/124 411/180 |

(Continued)

FOREIGN PATENT DOCUMENTS

DE   103 11 471 A1   9/2001
EP   0 426 951 B1   2/1994

(Continued)

OTHER PUBLICATIONS

English-language machine translation of FR 2 852 613 A1 by Patent Translation of the European Patent Office, 10 pages, available at http://translationportal.epo.org/empt/translate/?ACTION=description-retrieval&COUNTRY=FR&ENGINE=google&FORMAT=docdb&KIND=A1&LOCALE=en_EP&NUMBER=2852613&OPS=ops.epo.org/3.1&SRCLANG=fr&TRGLANG=en.*

(Continued)

*Primary Examiner* — Gary Estremsky
(74) *Attorney, Agent, or Firm* — Crowell & Moring LLP

(57) ABSTRACT

An anchoring sleeve for anchoring a fastening element in a bore hole of a component by a hardenable compound is disclosed. The anchoring sleeve has a sleeve-like base body with a first end, with a second end, as well as with several axially successive extension sections arranged between the ends which are each configured to be cone-like and their diameter respectively increases in the direction of the first end.

10 Claims, 2 Drawing Sheets

(56) References Cited

U.S. PATENT DOCUMENTS

| | | | |
|---|---|---|---|
| 5,740,651 A * | 4/1998 | Vanotti | 52/698 |
| 6,393,795 B1 * | 5/2002 | Irwin et al. | 52/698 |
| 6,896,462 B2 * | 5/2005 | Stevenson et al. | 411/82 |
| 7,802,951 B2 * | 9/2010 | Houck et al. | 411/82 |
| 7,955,024 B2 * | 6/2011 | Driscoll | E01C 5/16 404/19 |
| 8,087,850 B2 * | 1/2012 | Craig | 405/259.4 |
| 2005/0058521 A1 * | 3/2005 | Stevenson et al. | 411/82 |
| 2011/0038686 A1 * | 2/2011 | Glogger et al. | 411/82.1 |

FOREIGN PATENT DOCUMENTS

| | | |
|---|---|---|
| EP | 0 738 835 B1 | 10/1996 |
| EP | 1 101 956 A2 | 5/2001 |
| FR | 2 852 613 A1 | 9/2004 |
| WO | WO 98/55772 A1 | 12/1998 |
| WO | WO 2004/088041 A1 | 10/2004 |

OTHER PUBLICATIONS

1. Australian Office Action, dated May 30, 2011, total 2 pages.
European Search Report, dated Dec. 20, 2012, 7 pages.
Canadian Office Action issued in Canadian counterpart application No. 2,713,057 dated Apr. 18, 2016 (Three (3) pages).

* cited by examiner

ANCHORING SLEEVE

This application claims the priority of German Patent Document No. 10 2009 028 545.8, filed Aug. 14, 2009, the disclosure of which is expressly incorporated by reference herein.

BACKGROUND AND SUMMARY OF THE INVENTION

The invention relates to an anchoring sleeve for anchoring a fastening element in a bore hole of a component by means of a hardenable compound. The invention also relates to a fastening device having such an anchoring sleeve that can be anchored by means of a hardenable compound in a bore hole as well as to a fastening arrangement with a fastening device, which has a fastening element and such an anchoring sleeve, wherein the fastening device is anchored in a bore hole of a component by means of a hardenable compound.

In order to fasten attachment parts to a component such as foundations, walls, ceiling or the like, for example made of a mineral material like concrete, masonry or the like, anchoring a fastening element in a previously created bore hole in a component by means of a hardenable compound is known from U.S. Pat. No. 5,628,161.

For a secure anchoring of the fastening element, the bore hole must be cleaned with additional devices in a laborious manner prior to inserting the hardenable compound. Furthermore, these types of fastening devices are not suitable in tension zones of the component, because these zones do not exhibit any subsequent spreading behavior.

In order to overcome the aforementioned disadvantages, an anchor rod is known as a fastening element, for example from European Patent Document No. EP 0 426 951B1, which has a shaft with several successively arranged extensions, wherein the extensions are each configured to be cone-like and their diameter respectively increases towards the forward end of the anchor rod in the placement direction. Because of the conical surfaces on the anchor rod and the counter conical surfaces, which the hardened compound forms, when the anchor rod is under load, the normal forces acting on the anchor rod are converted into radially acting spreading forces so that this fastening arrangement may subsequently spread and thus can also be arranged in the tension zone of a component.

A disadvantage of the known attainment is that as a special element, this anchor rod is complicated and expensive to manufacture and, on the other hand, may only be used under defined limiting conditions, e.g., relating to the anchoring depth or thickness of the attachment part.

A sieve-like anchoring sleeve is known from European Patent Document No. EP 0 738 835B1 for an improved anchoring of a fastening element, which is available, for example, as a ready-made part, such as, for example, a threaded rod or a reinforcing rod, in a bore hole of a component by means of a hardenable compound. This anchoring sleeve has a sleeve-like base body with a first end, with a second end opposite from the first end as well as with several axially successive extension sections arranged between the ends.

The disadvantage of this known attainment is that a fastening arrangement produced like this does not exhibit any subsequent spreading behavior and therefore may not be arranged in a tension zone of a component.

The object of the invention is, on the one hand, to create an anchoring sleeve that is simple to manufacture that does not have the aforementioned disadvantages. Furthermore, a chemically anchorable fastening device with a fastening element and with an anchoring sleeve as well as a fastening arrangement with this type of fastening device is created which can be arranged in a tension zone of a component.

According to the invention, the extension sections of the anchoring sleeve are each configured to be cone-like and their diameter respectively increases in the direction of the first end.

The advantageously dimensionally stable anchoring sleeve, on the one hand, makes sure that conical surfaces are formed in the hardened compound and, on the other hand, simultaneously forms a separating plane or glide plane between the inner cones formed within the anchoring sleeve by the hardenable compound and the outer cones formed outside the anchoring sleeve. The hardened compound inside the anchoring sleeve is connected to the outside of the fastening element. No special requirements are placed on the fastening element, whereby, for example, a threaded rod as a ready-made part may also be used as a fastening element. The fastening element as well as the anchoring sleeve may be appropriately cut to length as desired or on the basis of the local conditions. A normal force acting on a positioned fastening element is redirected by the cone design that is created essentially into radially acting spreading forces.

Such an anchoring sleeve makes it possible to cost-effectively produce fastening devices as well as fastening arrangements that are flexible in application and also suitable for tension zones. In addition, this type of anchoring sleeve eliminates a laborious cleaning of the previously created bore hole, because the force deflection under load produces spreading forces in the substrate, and therefore adhesion of the hardenable compound on the bore hole wall is no longer imperative for a secure anchoring of the fastening device in the bore hole.

The anchoring sleeve made of a plastic is advantageously fabricated, for example, in an injection molding/casting process, in a blow-molding process or a deep-drawing process from foils, whereby the anchoring sleeve is simple to manufacture. Alternatively, the anchoring sleeve is fabricated of a metallic material, for example, in a stamping/bending method or excess pressure method. The anchoring sleeve is advantageously made available to the user as a one-piece element, wherein the anchoring sleeve may be configured to be one-piece or several pieces. In the case of an anchoring sleeve made of several parts, these parts may be connected advantageously to one another via connecting elements, e.g., snap-fit elements, to form the anchoring sleeve.

In addition to a design of the anchoring sleeve that is circular in cross-section, it may also have an oval or polygonal design, whereby free spaces or channels may be created for an advantageous flow of the hardenable compound between the wall of the bore hole and the anchoring sleeve (outer mass flow) as well as between the fastening element and the anchoring sleeve (inner mass flow). In the case of a design of the cross-section of the anchoring sleeve that starts with a circular cross-section, the free spaces or the channels for the mass flow or the mortar flow are arranged advantageously radially offset from one another from extension section to extension section.

The extension sections preferably run helically along the sleeve-like base body of the anchoring sleeve, whereby an advantageous flow of the hardenable compound is guaranteed in the space between the anchoring sleeve and the wall of the bore hole in the direction of the mouth of the bore hole. The slope of the helically running extension sections advantageously corresponds to 0.2 times to 1.0 times, in particular advantageously 0.4 times to 0.6 times, the outside diameter of the base body of the anchoring sleeve.

The extension sections also advantageously run helically on the inside of the anchoring sleeve, whereby an advantageous flow of the hardenable compound within the anchoring sleeve is guaranteed in the space between the anchoring sleeve and the fastening element in the direction of the mouth of the bore hole.

The conical angle of at least one extension section is preferably at least 10° with respect to a longitudinal axis of the anchoring sleeve. This conical angle is preferably configured to be no greater than 40°. In particular, this conical angle is advantageously between 20° and 30°, thereby guaranteeing an advantageous subsequent spreading behavior of a fastening arrangement with such an anchoring sleeve. A greater conical angle produces low radially acting spreading forces, which advantageously has a positive effect particularly on the edge of a component and in the case of components that have a low component thickness.

At least one passage opening for the hardenable compound is advantageously provided on the sleeve-like base body, through which the hardenable compound may flow out during the placement process or into the anchoring sleeve. Inclusions of air are avoided during placement of the anchoring sleeve with the at least one passage opening. The at least one passage opening is advantageously provided in the region of the first end of the sleeve-like base body so that, when the anchoring sleeve is in a positioned state, it comes to lie in the region of the bore hole base. Several smaller openings are also advantageously provided on the base body of the anchoring sleeve, which make it possible for the hardenable compound to flow within the anchoring sleeve into the space outside the anchoring sleeve or vice versa, but, in doing so, do not hinder the gliding of the inner and outer cones for an advantageous subsequent spreading behavior of the fastening arrangement with such an anchoring sleeve. In addition to at least one passage opening that is aligned essentially radially, the passage opening may also be provided to be open in an axial direction and between two extension sections. If several passage openings are provided on a sleeve-like base body, the passage openings are advantageously arranged spaced apart from one another radially.

The sleeve-like base body is preferably at least partially sealed at the first end so that this end forms a limit stop or a carrying section for a fastening element inserted into the anchoring sleeve. This design of the anchoring sleeve is then especially advantageous, if, for example, after filling the created bore hole with the hardenable compound, the anchoring sleeve with the fastening element is simultaneously inserted or inserted by the fastening element into the bore hole.

The sleeve-like base body is preferably filled with a defined quantity of the hardenable compound, whereby the user only has to handle one unit at the building site.

The fastening device according to the invention that can be anchored in a bore hole by means of a hardenable compound has a fastening element and an anchoring sleeve, which has a sleeve-like base body with a first end, with a second end opposite from the first end as well as with several axially successive extension sections arranged between the ends, wherein the extension sections are each configured to be cone-like and their diameter respectively increases in the direction of the first end.

This fastening device is easy to manufacture and makes a simple assembly possible in a bore hole of a component, such as, for example, in a wall or a ceiling.

The anchoring sleeve of the fastening device may have individual as well as also all features of the previously described anchoring sleeve.

The anchoring sleeve is preferably arranged on the fastening element, whereby it is held captively on the fastening element at least until the fastening device is positioned. The minimum inside diameter of the anchoring sleeve is advantageously smaller than the outside diameter of the fastening element, whereby the anchoring sleeve is simple to arrange on the fastening element. Furthermore, the fastening element is advantageously provided with a profiling on its exterior, e.g., with an outside thread, which, on the one hand, ensures an advantageous bond with the hardened compound and, on the other hand, in the case of at least partial contact on the interior of the anchoring sleeve, makes a simple arrangement of same possible on the fastening element.

The fastening arrangement according to the invention includes a fastening device with a fastening element and with an anchoring sleeve, wherein the fastening device is anchored in a bore hole of a component by means of a hardenable compound. The anchoring sleeve has a sleeve-like base body with a first end, with a second end opposite from the first end as well as with several axially successive extension sections arranged between the ends, wherein the extension sections are each configured to be cone-like and their diameter respectively increases in the direction of the first end.

This fastening arrangement is simple to manufacture and may also be arranged in a tension zone of a component. Because of the advantageous subsequent spreading behavior of the fastening arrangement when the fastening element is under load, a laborious separate cleaning of the bore hole prior to placement of the fastening device or prior to placement of the anchoring sleeve is no longer required. Despite this, high final loads of the anchored fastening device are achieved.

Because the currently required cleaning steps are eliminated (e.g., blowing out, brushing and repeated blowing out of the bore hole), application security is increased and placement of the fastening device is clearly accelerated. No additional cleaning devices are required for placing the fastening device and the ambient air, and thus, the user is no longer additionally burdened by blown-out drill dust or cleaning dust.

The anchoring sleeve or the fastening device may have individual as well as also all features of the previously described anchoring sleeve or the previously described fastening device.

The invention is explained in greater detail in the following on the basis of exemplary embodiments.

DETAILED DESCRIPTION OF THE DRAWINGS

As a rule, the same parts are identified by the same reference numbers in the figures.

Figure 1:
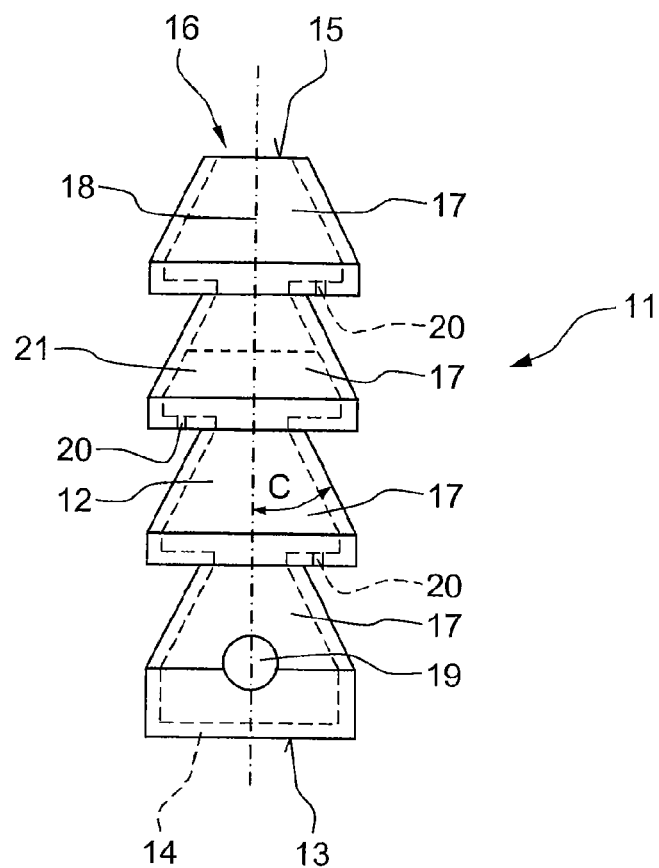
FIG. 1 is a first exemplary embodiment of an anchoring sleeve.

The anchoring sleeve 11 depicted in FIG. 1 for anchoring a fastening element in a bore hole of a component by means of a hardenable compound has a sleeve-like base body 12.

The sleeve-like base body 12 has a first end 13 with a base section 14, which seals the sleeve-like base body 12 in the region of the first end 13, and a second end 15 opposite from the first end 13, which is provided with an insertion opening 16 for the fastening element.

In addition, the sleeve-like base body 12 has several axially successive extension sections 17 arranged between the ends 13 and 15, each of which is configured to be cone-like and whose diameter respectively increases in the direction of the first end 13. The conical angle C of the extension sections is at least 10° with respect to a longitudinal axis 18 of the anchoring sleeve 11. In this exemplary embodiment, each extension section 17 has the same conical angle C of 25°.

A passage opening 19 for the hardenable compound 21 is provided on the base body 12 in the region of the first end 13. In addition, passage opening 20 for the hardenable compound 21 is/are provided between the extension sections 17, which in this exemplary embodiment are arranged in an alternating manner with respect to a circumference of the base body 12.

The sleeve-like base body 12 is filled with a defined quantity of the hardenable compound and is available to the user as a unit. Instead of a factory filling of the anchoring sleeve 11, it may also be filled on-site, e.g., by the user himself/herself, with hardenable compound, for example, before or after inserting the anchoring sleeve 11 into the bore hole.

To create a fastening arrangement, the anchoring sleeve 11 is inserted with its first end 13 forward into a bore hole.

Figure 3:
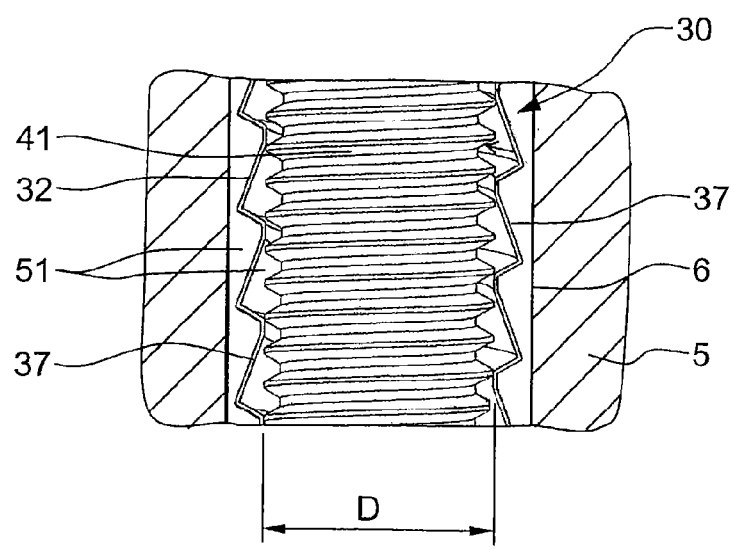
FIG. 3 is a detailed view through the fastening arrangement according to FIG. 2.
Figure 2:
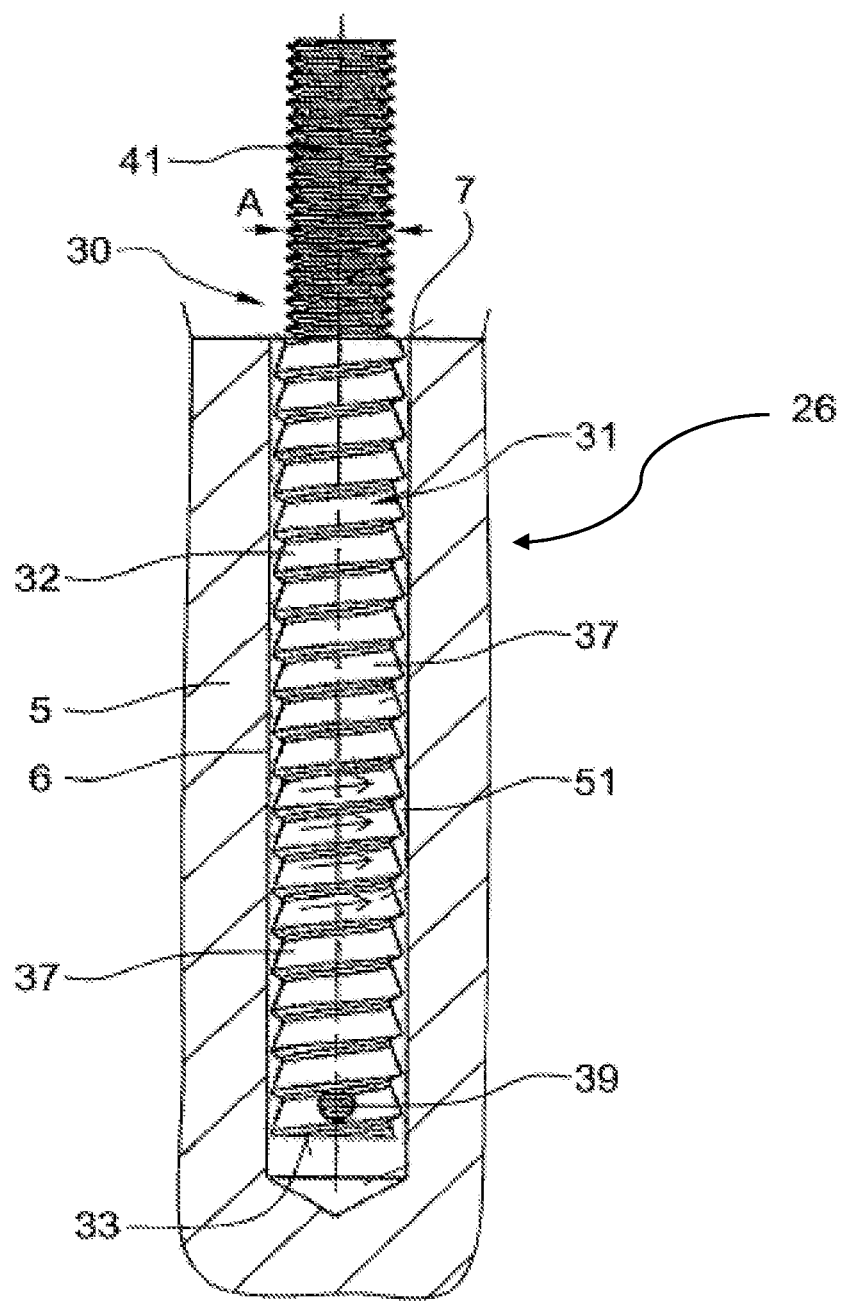
FIG. 2 is a fastening arrangement with a second exemplary embodiment of an anchoring sleeve.

FIGS. 2 and 3 show a fastening arrangement 26, which has a fastening element 41 and an anchoring sleeve 31, which are anchored in a bore hole 6 of a component 5 by means of a hardenable compound 51 and which form a fastening device 30.

The cone-shaped extension sections 37, whose diameter widens in the direction of the first end 33 of the sleeve-like base body 32, run helically along the sleeve-like base body 32. A passage opening 39 for the hardenable compound 51 is provided on the base body 32 in the region of the first end 33.

To arrange the anchoring sleeve 31 on the fastening element 41, its sleeve-like base body 32 features minimum inside diameter D, which is at least partially somewhat smaller than the outside diameter A of the fastening element 41.

First, a bore hole 6 with the required depth is created in the component 5. Then the bore hole 6 is filled with a corresponding quantity of the hardenable compound 51 and then the fastening device 30 is inserted into the bore hole 6 with the first end 33 of the anchoring sleeve 31 forward. In doing so, on the one hand, hardenable compound 51 penetrates into the interior, i.e., the inside space between the sleeve-like base body 32 of the anchoring sleeve 31 and the fastening element 41, and, on the other hand, the hardenable compound 51 in the gap, i.e., the space between the anchoring sleeve 31 and the wall of the bore hole 6, is displaced in the direction of the mouth of the bore hole 7. Due to the helical embodiment of the cone-shaped extension sections 37, an optimum flow of the hardenable compound 51 in the direction of the mouth of the bore hole 7 is guaranteed inside as well as outside the anchoring sleeve 31. After the hardenable compound 51 hardens, the fastening device 30 is loadable to the maximum load level.

In alternative methods, the anchoring sleeve 11 or 31 is inserted first and separately from the fastening element 41 into the created bore hole 6 and then subsequently the fastening element 41 is inserted into the corresponding anchoring sleeve 11 or 31. In doing so, the bore hole 6 may be filled with the hardenable compound 51 prior to insertion of the corresponding anchoring sleeve 11 or 31. Alternatively, the hardenable compound may also be inserted into the anchoring sleeve 11 or 31 after insertion of the corresponding anchoring sleeve 11 or 31 into the bore hole 6. In another, non-exhaustive variant, the hardenable compound 51 is filled in or inserted after inserting the fastening element 41 into the corresponding anchoring sleeve 11 or 31.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A fastening arrangement, comprising:
   a fastening element; and
   an anchoring sleeve, wherein the fastening element is disposed in the anchoring sleeve and wherein the fastening element and the anchoring sleeve are anchored in a bore hole by a compound;
   wherein the anchoring sleeve has a sleeve-like base body with a first end and a second end opposite from the first end and a plurality of axially successive extension sections arranged between the first end and the second end, wherein the plurality of extension sections are cone-like, and wherein a diameter of each of the plurality of extension sections increases in a direction of the first end;
   wherein the anchoring sleeve forms conical surfaces in the compound and simultaneously forms a separating plane or glide plane between inner cones formed within the anchoring sleeve by the compound and outer cones formed outside the anchoring sleeve by the compound, wherein the separating or glide plane allows gliding of the inner and outer cones for a spreading behavior of the fastening arrangement when the fastening arrangement is under a load.

2. The fastening arrangement according to claim 1, wherein the plurality of extension sections run helically along the sleeve-like base body.

3. The fastening arrangement according to claim 1, wherein a conical angle of at least one of the plurality of extension sections is at least 10° with respect to a longitudinal axis of the anchoring sleeve.

4. The fastening arrangement according to claim 1, wherein the sleeve-like base body defines a passage opening for the compound.

5. The fastening arrangement according to claim 4, wherein the passage opening is disposed in an area of the first end of the sleeve-like base body.

6. The fastening arrangement according to claim 4, wherein the passage opening is disposed on an underside of one of the plurality of extension sections.

7. The fastening arrangement according to claim 1, wherein the sleeve-like base body is at least partly closed at the first end.

8. The fastening arrangement according to claim 1, wherein the sleeve-like base body is filled with a defined quantity of the compound.

9. The fastening arrangement according to claim 1, wherein the anchoring sleeve is fixed to the fastening element.

10. The fastening arrangement according to claim 1, wherein the compound inside the anchoring sleeve is connected to an outside of the fastening element.

\* \* \* \* \*